(12) United States Patent  
Jury et al.

(10) Patent No.: US 8,913,341 B1
(45) Date of Patent: Dec. 16, 2014

(54) NOISE CANCELLATION USING CROSS-TRACK SCANS

(71) Applicant: Seagate Technology LLC, Cupertino, CA (US)

(72) Inventors: Jason C. Jury, Minneapolis, MN (US); Michael J. Link, St. Paul, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 13/956,043

(22) Filed: Jul. 31, 2013

(51) Int. Cl.
G11B 21/02 (2006.01)
G11B 20/10 (2006.01)

(52) U.S. Cl.
CPC ............... *G11B 20/10046* (2013.01)
USPC .......... 360/75; 360/39; 360/55; 360/69

(58) Field of Classification Search
None
See application file for complete search history.

(56) References Cited

U.S. PATENT DOCUMENTS

| 5,886,969 A * | 3/1999 | Maeda et al. ............. 369/59.23 |
| 2010/0211830 A1 | 8/2010 | Sankaranarayanan et al. |
| 2012/0275497 A1 | 11/2012 | Li et al. |
| 2012/0281310 A1 | 11/2012 | Lim et al. |
| 2012/0288014 A1 | 11/2012 | Au et al. |

* cited by examiner

*Primary Examiner* — Muhammad N Edun
(74) *Attorney, Agent, or Firm* — Hollingsworth Davis, LLC

(57) ABSTRACT

Multiple signals are read, respectively, from multiple different cross-track positions of a track of a magnetic medium. Weighting coefficients for each of the multiple signals are determined. The weighting coefficients are applied to the respective signals to form weighted signals. The weighted signals are combined and the combined signal is used to recover data stored in the track.

19 Claims, 18 Drawing Sheets

NOISE CANCELLATION USING CROSS-TRACK SCANS

SUMMARY

The present disclosure is related to systems and methods that facilitate detecting track information from multiple signals read from a track of a data storage medium. One embodiment is directed to a method that includes reading multiple signals, respectively, from multiple different cross-track positions of a track of a magnetic medium. Weighting coefficients for each of the multiple signals are determined. The weighting coefficients are applied to the respective signals to determine weighted signals. The weighted signals are combined to recover data stored in the track.

Some embodiments are directed to an apparatus that includes a memory controller. The controller is capable of being coupled to a read element that includes at least one read transducer. The controller is configured to control the read element to read multiple signals, respectively, from multiple different cross-track positions of a track of a magnetic medium, determine a weighting coefficient for each signal, apply the weighting coefficients to the respective signals to determine weighted signals, and combine the weighted signals to recover data stored in the track.

These and other features and aspects of various embodiments may be understood in view of the following detailed discussion and accompanying drawings

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

Increases in areal density (AD) of magnetic data storage devices may be achieved by aggressively increasing bits-per-inch (BPI) and tracks-per-inch (TPI) of the recording media. Current challenges in increasing TPI (e.g., squeezing tracks closer together) include increasing the possibility of the read-head picking up interference from adjacent tracks. The read interference can be due to track mis-registration (TMR) and/or due to track squeezing to achieve decreased TPI. In some implementations, tracks are intentionally squeezed together to implement higher density recording schemes such as shingled recording. In some situations, the signal-to-noise (SNR) of a track may be too low to allow for recovery of the data from the track using a single track read at a particular track location.

Embodiments described herein involve combining multiple read-back signals from a magnetic media to obtain a single combined output signal. Read-back signals are obtained from multiple different cross-track positions of the same track of a magnetic medium. The multiple signals are combined to a single output to recover the data stored on the track, also known as the target track in some embodiments. Combination of the multiple signals can involve determining weighting coefficients for each of the signals using a model based on statistical information. The weighting coefficients are applied to the signals to form weighted signals. The weighted signals are combined to recover the data stored in the track or target track.

The embodiments described herein are generally directed to detecting data using a multiple element read element that makes one or more passes over a track or a single element read element that makes multiple passes over a track, each pass at a different cross-track position. While the approaches discussed herein may be applicable to reading data from continuous perpendicular media including shingled media, the approaches may also be applicable to other technologies, including bit patterned (BPM), two dimension magnetic recording (TDMR), multi-signal magnetic recording (MSMR) and/or energy assisted magnetic media such as heat assisted magnetic media (HAMR).

Figure 1:
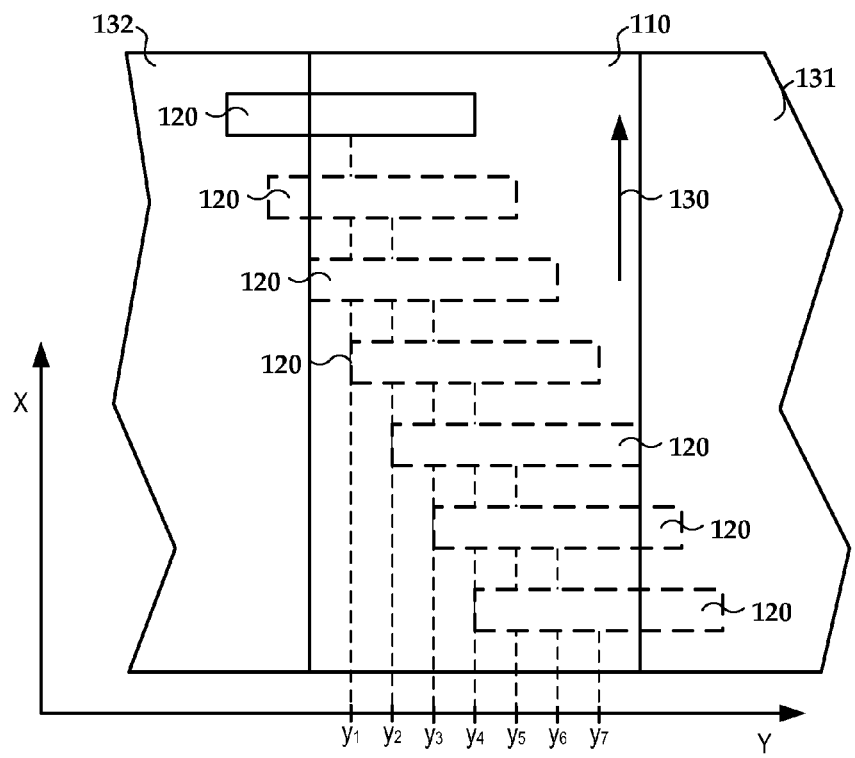
FIG. 1 is a block diagram illustrating a read element arrangement according to an example embodiment.

FIG. 1 illustrates a magnetic media track 110 having a down track direction, x, and a cross track direction, y. FIG. 1 shows a read element 120 centered at several cross-track positions $y_1$, $y_2$, $y_3$, $y_4$, $y_5$, $y_6$, $y_7$ of the track 110. At each cross-track position $y_1$, $y_2$, $y_3$, $y_4$, $y_5$, $y_6$, $y_7$ of the reader element 120, the track 110 moves in the direction of arrow 130. As the magnetic track 110 moves relative to the read element 120, the read element detects magnetic information stored in the track 110, and converts the magnetic information to an electrical signal (also referred to herein as a read-back signal). In some implementations reading multiple signals at multiple cross-track positions involves multiple passes of a read element over the track, wherein the position of the read element is shifted in the cross-track direction for each pass of the track relative to the read element.

Figure 2:
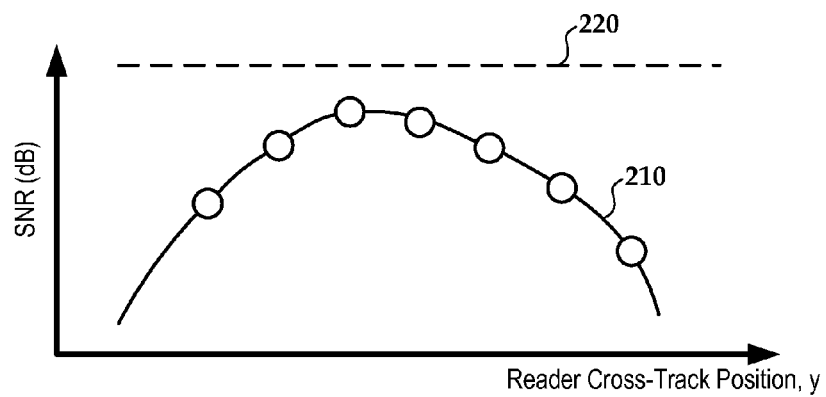
FIG. 2 shows is a graph of the signal-to-noise ratio (SNR) in dB as a function of read element position for the individual read-back signals produced at multiple cross-track positions.

FIG. 2 shows is a graph 210 of the signal-to-noise ratio (SNR) in dB as a function of read element position for the individual read-back signals produced at the multiple cross-track positions. The read-back signals vary across the track. In this particular example, the read-back signals nearer the center of the track have higher SNR, but none of the individual read-back signals has an SNR that achieves a specified SNR level 220 that allows reliable recovery of the data from the read-back signal. According to embodiments discussed herein, a weighted combination of the individual signals can provide a higher SNR for the combined signal when compared to any of the individual read-back signals, so that the combined signal achieves the specified SNR 220.

Figure 3:
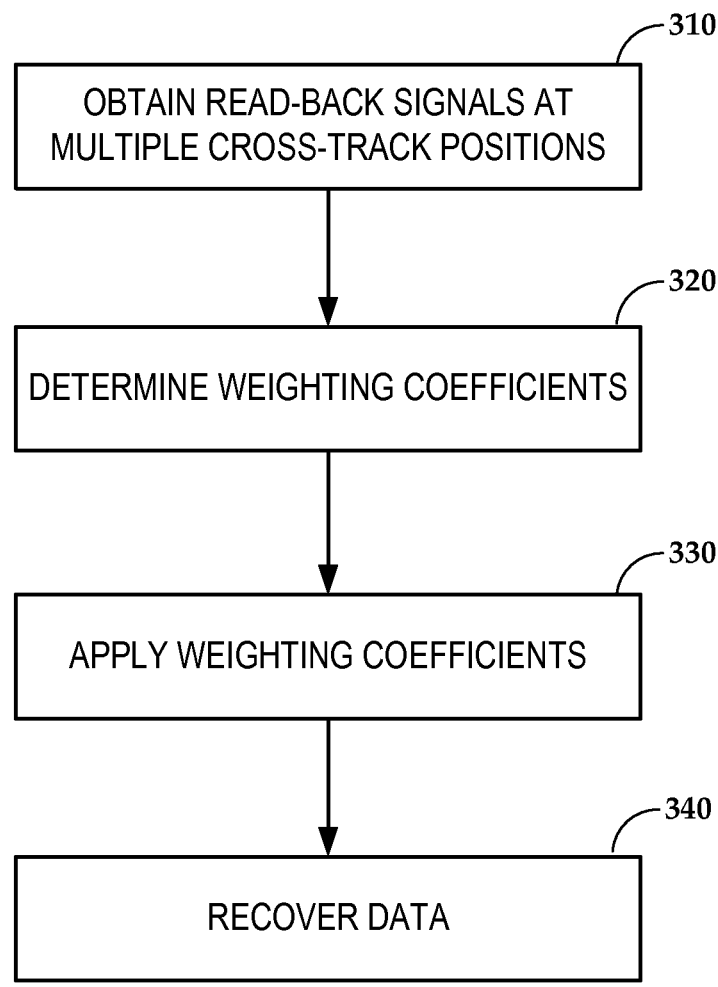
FIG. 3 is a flow diagram that illustrates a process for recovering data using multiple cross-track scans in accordance with some embodiments.

FIG. 3 is a flow diagram that illustrates a process for recovering data in accordance with some embodiments. The process includes generating 310 read-back signals from a magnetic medium at multiple cross-track positions. The process includes determining 320 a weighting coefficient for each individual read-back signal. The weighting coefficients may be determined before the read-back signals are obtained or may be determined on-the-fly after the read-back signals are obtained. In the former scenario, the weighting signals may be determined in an initialization process and then applied to subsequently obtained read-back signals. At each cross-track position $y_k$, the read-back signal is a vector $r_k$. The combined signal s can be determined according to the Equation 1.

$$s = \sum_{k}^{N} h_k r_k. \quad [1]$$

The array of weighting coefficients $h_k=[h_1 \ldots h_N]$ can be determined using a variety of estimation techniques. In some embodiments, the estimation techniques used to determine the weighting coefficients involve the use of a statistical approach. One such statistical estimation technique is minimum mean square error (MMSE) which refers to Bayesian estimation with a quadratic cost function. The MMSE technique estimates the weighting coefficients by minimizing the mean square error of the linear combination of the individual signals with respect to an ideal signal. For this technique it is useful to define the ideal signal $s_{ideal}$ and the cross-correlation vector p between the ideal and individual read-hack signals:

$$p = \begin{bmatrix} E\{s_{ideal}^T r_1\} \\ \vdots \\ E\{s_{ideal}^T r_N\} \end{bmatrix}, \quad [2]$$

where E{ } is the expectation (average) operator. The ideal signal is usually taken to be the result of convolving the data pattern with the Viterbi detector target.

It is also useful to define the read-back signal auto-correlation matrix R as:

$$R = \begin{bmatrix} E\{r_1^T r_1\} & \ldots & E\{r_1^T r_N\} \\ \vdots & \ddots & \vdots \\ E\{r_N^T r_1\} & \ldots & E\{r_N^T r_N\} \end{bmatrix} \quad [3]$$

Using MMSE, the weighting coefficients can be estimated using Equation 2.

$$h = R^{-1} p \quad [4].$$

In one approach suitable for initial calibration, p and R are calibrated for a predetermined set of offtrack read locations. This would be done by subjecting a data track written with a known calibration pattern to stress from a squeezed adjacent track. Then, with the ideal signal $s_{ideal}$ known, p and R are determined from the sequence of read-back signals. This enables the determination of h, the weighting coefficient vector, for an initial calibration.

If the data on a stressed track is unknown, then the ideal signal may be estimated by using preliminary estimates (approximations) of the data pattern inferred at different points of the detection/decoding process. For example, the best guess of the data pattern after attempting to detect/decode the data from the k-th re-read may be used to provide an ideal signal for determining p for the linear combiner weights h for the (k+1) read-back signals.

One alternative approach to determining the linear combiner weights is the least mean squares (LMS) algorithm, which is an iterative (adaptive) version of solving for h. Rather than determining the {R,p} explicitly, an error signal e is utilized, defined as the difference between the combined signal s and ideal signal $s_{ideal}$:

$$e = s - s_{ideal}. \quad [5]$$

At sample time n, this can be expressed as:

$$e[n] = s[n] - s_{ideal}[n]. \quad [6]$$

The weight coefficients in h can be updated using the LMS algorithm as:

$$h_{n+1} = h_n + \mu E\{r[n]e[n]\}, \quad [7]$$

where $\mu$ is an update parameter ($0<\mu<1$) and an approximate estimate of $E\{r[n]e[n]\}$ can be used in the update expression above, for example the following estimate over the most recent K samples:

$$E\{r[n]e[n]\} = \frac{1}{K} \sum_{k=0}^{K-1} r[n-k]e[n-k]. \quad [8]$$

The MMSE and LMS methods assume that combining the read-back signals to most closely resemble the ideal signal is the best approach. However, this approach may not result in the highest signal-to-noise ratio at the detector. This may be the case if the unstressed Viterbi detector target is not as well suited for recovering data under squeeze stress from adjacent tracks with linear combiner approach. Instead, one may seek to maximize the SNR directly using a method like maximum likelihood. Assume the original pattern written to a data track is x. Then the maximum likelihood (ML) method seeks the underlying pattern x that maximizes the likelihood function of the set of read-back signals r given x:

$$L(x) = \log \{Pr[r_1, \ldots, r_K | x]\}. \quad [9]$$

To implement the ML method, one is required to make assumptions about the statistical properties of the read-back signals. If one assumes the read-back signals r consist of a noise-free signal m and additive noise w:

$$r_k = m_k + w_k \quad [10]$$

the combined mean signal is:

$$s_m = [m_1 \ldots m_K]h \quad [11]$$

and the combined noise is:

$$s_w = [w_1 \ldots w_K]h \quad [12]$$

The combined mean signal power SP is:

$$SP = s_m^T s_m = h^T A h \quad [13]$$

where A is a generalized signal matrix:

$$A = [m_1 \ldots m_K]^T [m_1 \ldots m_K] \quad [14]$$

The combined noise power NP is:

$$NP = E\{s_w^T s_w\} = h^T \Sigma h \quad [15]$$

where $\Sigma$ is a noise covariance matrix:

$$\Sigma = \begin{bmatrix} E\{w_1^T w_1\} & \ldots & E\{w_1^T w_N\} \\ \vdots & \ddots & \vdots \\ E\{w_N^T w_1\} & \ldots & E\{w_N^T w_N\} \end{bmatrix} \quad [16]$$

Assuming the signal and noise both are stationary, the ML method yields an SNR metric γ based on the linear combiner weights h, the generalized signal matrix A, and the noise covariance matrix $\Sigma$:

$$\gamma = \frac{h^T A h}{h^T \Sigma h} \quad [17]$$

This metric can be recast in a simpler form by first factoring the noise matrix E as follows:

$$\Sigma = U^T \Lambda U \quad [18]$$

Then we introduce the transformation:

$$y = \Lambda^{\frac{1}{2}} U h \quad [19]$$

$$h = U^{-1} \Lambda^{-\frac{1}{2}} y \quad [20]$$

$$V = \Lambda^{-\frac{1}{2}} U A U^T \Lambda^{-\frac{1}{2}} \quad [21]$$

and we recast the SNR expression as:

$$\gamma = \frac{y^T V y}{y^T y} \quad [22]$$

To determine the linear combiner weights h that maximize the SNR, we first find the maximum eigenvalue $\lambda_{max}$ of the matrix V and the corresponding eigenvector $v_{max}$. Then the optimum vector $h_{opt}$ can be found from:

$$h_{opt} = U^{-1} \Lambda^{-\frac{1}{2}} v_{max} \quad [23]$$

The generalized signal and noise matrices A and $\Sigma$ can be found in a calibration phase by using a fixed calibration pattern for many sectors. This would allow one to estimate the mean read-back signals m, and subsequently estimate the noise covariance $\Sigma$ based on estimates of the read-back noise w for each sector.

Returning now to the flow diagram of FIG. 3, after the weighting coefficients are determined, the weighting coefficients are applied 330 to the read-back signals. The weighted read-back signals are combined to recover 340 the data.

Figure 4:
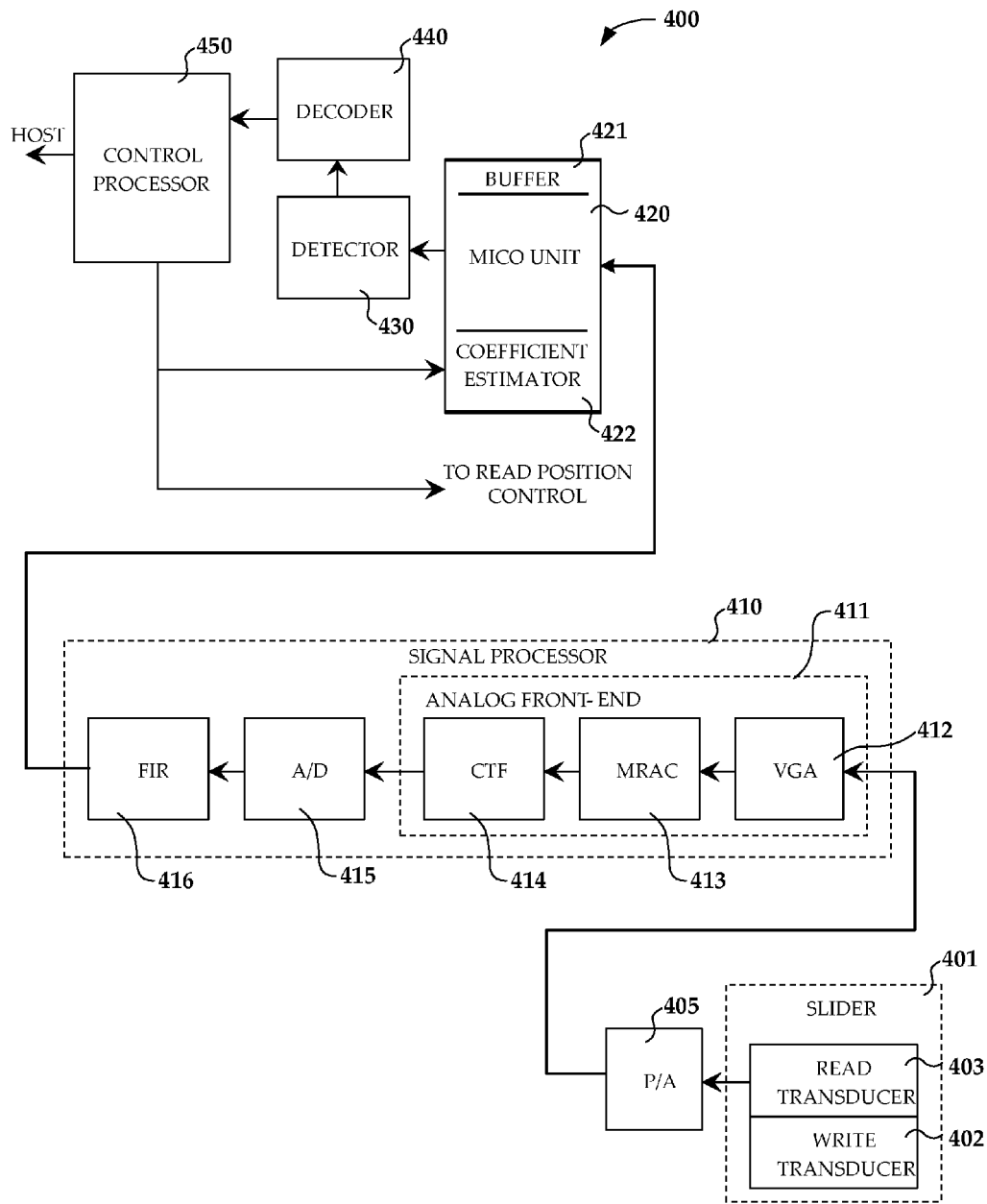
FIG. 4 is a block diagram of a system configured to implement multiple input signals /combined output (MICO) signal approaches in accordance with embodiments described herein.

FIG. 4 is a block diagram of a system configured to implement multiple input signals /combined output signal approaches described herein. System 400 includes slider 401 that carries magnetic write transducer 402 capable of converting electrical signals to magnetic fields that cause data to be magnetically stored in the magnetic medium and magnetic read transducer 403 capable of sensing the localized magnetic fields of the magnetic medium and converting the localized magnetic fields into voltage signals. During operation, the magnetic read transducer 403 and the magnetic write transducer 402 are magnetically coupled to a magnetic medium (not shown in FIG. 4) which comprises a number of tracks in which data are stored in the magnetic field transitions of the magnetic medium grains.

In conjunction with a read operation, the read-back signal generated by the read transducer is amplified by a preamplifier 405 that applies an initial, e.g., fixed, amplification to the read-back signal. The read-back signal is further processed by a signal processor 410. FIG. 4 shows one configuration of a signal processor 410. It will be appreciated that alternative configurations of the signal processor are possible and the particular configuration shown in FIG. 4 is provided for purposes of illustration and not limitation. The signal processor 410 depicted in FIG. 4 includes an analog front-end 411 and digital filtering.

The read-back signal at the output of preamplifier 405 is amplified in a second stage of amplification in the analog front end portion 411 of the signal processor 410 using a variable gain amplifier (VGA) 412. Amplification of the preamplifier output by the VGA 412 provides an appropriate signal level for further signal processing. The analog front-end 411 includes magneto-resistive asymmetry compensation circuitry 413 that applies a non-linear transfer function, e.g., quadratic function, to correct for asymmetry in the read-back signal. A continuous time filter (CTF) 414 is a low-pass filter configured to remove high frequency noise. The CTF 414 can also serve to provide group delay or some high frequency boost.

The output from the analog front end 411 is digitized by analog-to-digital (A/D) converter 415. The A/D 415 samples the CTF output at the data rate, and quantizes the analog data to a specified precision. A digital finite impulse response (FIR) filter 416 shapes the digitized signal so that it exhibits optimal behavior for detection.

The output of the signal processor is provided to a multiple input combined output (MICO) unit 420. The MICO 420 includes a buffer 421 configured to store read-back signals that are obtained from multiple cross-track locations. In some configurations, the multiple read-back signals are generated from multiple passes of a single read transducer along a track at different cross track positions. Alternatively multiple read-back signals are generated from a single pass of a read element that includes multiple read transducers, wherein the each of the multiple read transducers are positioned at different cross-track positions. The MICO unit 420 includes a coefficient estimator 422 that estimates a weighting coefficient for each of the multiple signals, e.g., using a probabilistic estimation technique such as MMSE, or other technique as discussed herein. The MICO unit 420 applies the weighting coefficients to the buffered read-back signals and combines the weighted signals into a combined signal. The MICO 420 recovers the stored data using the combined signal. The data from the combined signal is provided to a detector 430 that converts the digitized data into ones and zeros and in some embodiments also provides confidence information and outputs the data (possibly with confidence information) to a decoder 440. The decoder 440 applies an error correcting code (ECC) to detect and/or correct errors in the data. In some embodiments, the detector 430 provides confidence information (soft output information) to the decoder 440. For example, in some embodiments, the detector 430 may execute a soft output Viterbi algorithm (SOVA) and the decoder may be a low density parity check (LDPC) decoder. In some configurations, the detector 430 and decoder 440 operate iteratively to recover the data.

Controller processor 450 is arranged to control various operations of the data storage unit. For example, the control processor 450 may operate in conjunction with position control circuitry and medium transport mechanism (not shown in FIG. 4) to control relative movement between the read element and the magnetic medium. The control processor 450 and the position control circuitry cause the slider 401 to move the read transducer 403 to multiple cross-track positions of a single track of the medium such that the read transducer 403 reads a signal at each of the multiple cross-track positions as the medium moves relative to the slider 401 along a down-track direction. Some information about the pattern so that the different cross correlation equations in FIG. 5 could be hard decisions and/or the soft information of the pattern.

The block diagram of FIG. 4 shows system components are divided into functional blocks. It will be appreciated by those skilled in the art that there exist many possible configurations in which these functional blocks can be arranged and implemented. The examples depicted herein provide some of the many possible functional arrangements for the system components. According to some embodiments, the system of FIG. 4 is capable of implementing the processes involving noise cancellation using cross-track scans such as the processes illustrated by the flow diagrams illustrated herein, e.g., in FIGS. 3, 7, and 9.

Figure 5:
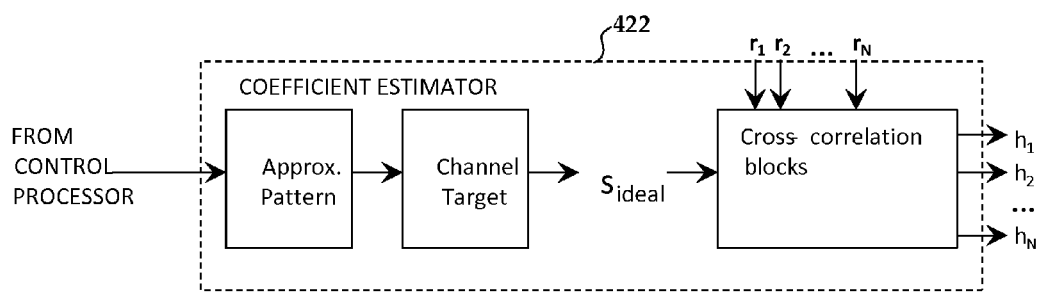
FIG. 5 provides a more detailed configuration of the coefficient estimator in accordance with some embodiment.

FIG. 5 provides a more detailed configuration of the coefficient estimator 422. The coefficient estimator receives a feedback signal from the control processor that provides an approximation of the data pattern received from the decoder. In some embodiments, the approximated data pattern provided by the control processor may be a hard data pattern, comprising a pattern of ones and zeros, without confidence information. In some embodiments, the approximated data pattern may include soft information. For example, each of the bits of the data pattern may include information that provides a confidence level for that bit. In some implementations the bit value and the confidence information may be expressed as a log likelihood ratio (LLR).

The approximate pattern may be convolved with a channel target response to obtain the ideal signal, $s_{ideal}$. The ideal signal is used to develop the cross-correlation vector p between the ideal signal, $s_{ideal}$, and the individual read-back signals $r_1, \ldots, r_N$, as shown in Equation 2 and in FIG. 5. The ideal signal is usually taken to be the result of convolving the data pattern provided by the control processor with the Viterbi detector target, e.g., the impulse response of the channel.

It is also useful to define the read-back signal auto-correlation matrix R as shown above in Equation 3 and in FIG. 5. The weighting coefficients, h, may be determined from the cross correlation vector, p, and the read-back signal autocorrelation matrix, R, as indicated in Equation 3 and FIG. 5.

In some implementations, the weighting coefficients are learned using a statistical estimator such as MMSE. Other statistical estimation techniques may alternatively be used, such as a maximum likelihood method (SNR maximization approach).

Each track of the medium may have different weighting coefficients than other tracks of the same medium. In some implementations, the weighting coefficients for the multiple signals for each track may be determined during a initialization calibration test, e.g., during the manufacturing process. If the weighting coefficients are determined as part of the manufacturing process, the weighting coefficients may not be changed after they are initially determined.

In some implementations, the weighting coefficients may be determined on-the-fly while the medium is in use. In on-the-fly implementations, the weighting factors for the tracks may be changed in response to changing track conditions during operation. On-the-fly implementations may be helpful in situations that have a varying amount of track mis-registration and/or encroachment from adjacent tracks that change over time.

Figure 6:
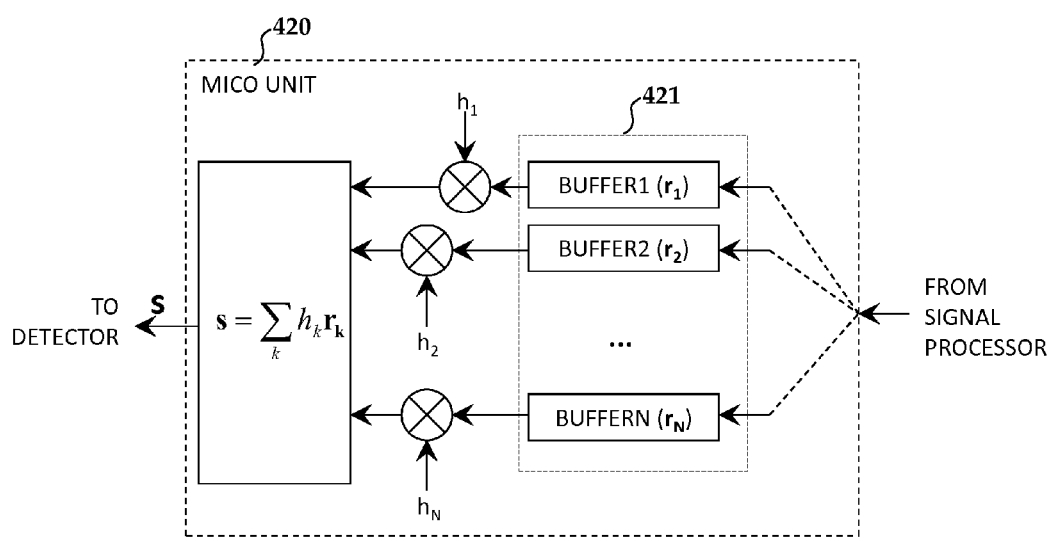
FIG. 6 depicts a more detailed view of a portion of the MICO unit and the MICO unit buffer in accordance with some embodiments.

FIG. 6 depicts a more detailed view of a portion of the MICO unit 420 and the MICO unit buffer 421. Read-back signals that have been conditioned by the signal processor are received by the MICO unit. Read-back signals $r_1, r_2, \ldots r_N$ for N cross track scans are stored in buffer locations of the buffer 421. As indicated by FIG. 6, a first read-back signal, $r_1$, from a first cross-track scan is stored in buffer location BUFFER1, a second read-back signal, $r_2$, from a second cross-track scan is stored in buffer location BUFFER2, and so forth, including an Nth read-back signal $r_N$ which is stored in buffer location BUFFERN. The weighting coefficients $h_1, h_2, \ldots h_N$ are estimated by the coefficient estimator 422 e.g., using a probabilistic estimation technique as discussed in connection with FIG. 5. Read-back signals $r_1, r_2, \ldots r_N$ are multiplied, respectively, by weighting coefficients $h_1, h_2, \ldots h_N$. The weighted read-back signals are summed in the MICO unit. The MICO unit provides the composite signal, s, which is a sum of the weighted read-back signals to the detector.

In some embodiments, data reliability may be further enhanced by averaging or otherwise combining read-back signals obtained by re-reading the signal at the same track location. According to a version of this technique, a first set of read-back signals, $r_{k-1} = r_{1-1}, r_{2-1}, \ldots r_{N-1}$, is obtained by scanning across the track and reading the track at N cross-track locations, $y_1$ through $y_N$. The first set of read-back signals, $r_{1-1}, r_{2-1}, \ldots r_{N-1}$, are stored in buffer locations BUFFER1, BUFFER 2, ... BUFFERN, respectively, shown in FIG. 6. Weighting coefficients are determined for the read-back signals (see, FIG. 5), the weighting coefficients are applied to the read-back signals to form a first set of weighted read-back signals. The sum of the weighted read-back signals is determined (see FIG. 6). The detector attempts to recover the data from the sum of the first set of weighted read-back signals. If there are no unrecoverable errors, the decoded data may be transferred to the host. However, if the decoder determines that there are one or more unrecoverable errors, a second set of read-back signals, $r_{k-2}=r_{1-2}, r_{2-2}, \ldots, r_{N-2}$, may be obtained by re-reading the track again at the same N cross-track locations. The first set of read-back signals are combined with respective ones of the second set of read-back signals. For example, the set of combined read-back signals can be expressed as $RC_1$. The first set of read-back signals are replaced by the combined read-back signals $r_{1\text{-}comb}$, $r_{2\text{-}comb}, \ldots, r_{N\text{-}comb}$ in the buffers, BUFFER1, BUFFER 2, ... BUFFERN, respectively.

In addition to the weighting coefficients $h_k=[h_1 \ldots h_N]$ applied to the read-back signals read from multiple cross-track locations, a re-read coefficient may be applied to the read-back signals for each of the re-reads. For example, the re-read coefficients may be $1-\alpha(i)$, where i is the increment of the re-read, e.g., up to about 10 re-reads, and the a values are stored in an array. In some implementations, the first a value, $\alpha(1)$ is set to zero. Each of the first set of read-back signals $r_{1-1}, r_{2-1}, \ldots r_{N-1}$ are multiplied by $1-\alpha(i)$, where i=1, and $1-\alpha(1)=1$ if $\alpha(1)=0$. After the re-read coefficients are applied the combined signal can be written:

$$s_{comb} = \sum_{i=1}^{I} [(1-)\alpha(i)] \sum_{k=1}^{N} h_k r_{k-i}. \quad [24]$$

Re-reading the cross-track scans works well in situations in which a large component of the noise is not repeatable noise. Repeatable noise will be repeated in exactly the same places for each reread and includes sources such as media (transition) noise, nonlinear transition shift (NLTS) after precompensation, partial erasure, overwrite noise, thermal asperities, media defects and adjacent off-track writes. Non-repeatable noise gives the approaches descried above an opportunity to recover a failed sector on two or more reads. Examples of sources of nonrepeatable noise are electronic noise, read head noise and the non-repeatable component of track mis-registration.

Some $\alpha$ values are easier for calculation purposes, for example, weighted values that allow recalculation to be performed by performing right shifts of the digitized value and then adding or subtracting a value. For example, an embodiment may use values of .alpha., such as $\alpha(1)=0$, $\alpha(2)=\frac{3}{8}$ or $\frac{7}{16}$, $.\alpha(3)=\frac{12}{16}$ or $\frac{3}{8}$ can be derived from ($\frac{4}{8}-\frac{1}{8}$), which can be achieved by shifting the original digitized value 1 bit position to the right, shifting the original digitized value 3 bit positions to the right, and subtracting the second value from the first value. The value $\frac{7}{16}$ can be derived from $\frac{8}{16}-\frac{1}{16}$, which can be achieved by shifting the original digitized value 1 bit position to the right, shifting the original digitized value 4 bit positions to the right, and subtracting the second value from the first value. The value $\frac{12}{16}$ can be derived from $\frac{8}{16}+\frac{4}{16}$, which can be achieved by shifting the original digitized value 1 bit position to the right, shifting the original digitized value 2 bit positions to the right, and adding the two values.

Further, the values of $\alpha$ can be predetermined such that after a specific number of unsuccessful attempts to read a track portion, the previous read attempts will be ignored. For example, if $\alpha(5)$ is set to 0, then on the fifth read attempt, the previous read attempts would be ignored because they would receive the weighting of $\alpha(5)$ or 0, and the information from the fifth read attempt would be given a weight of $1-\alpha(5)$, or 1–0, which is 1.

Furthermore, the parameter $\alpha$ depends on four values, signal-to-noise ratio (SNR), a repeatable noise component, block length, and ECC correction power.

Figure 7:
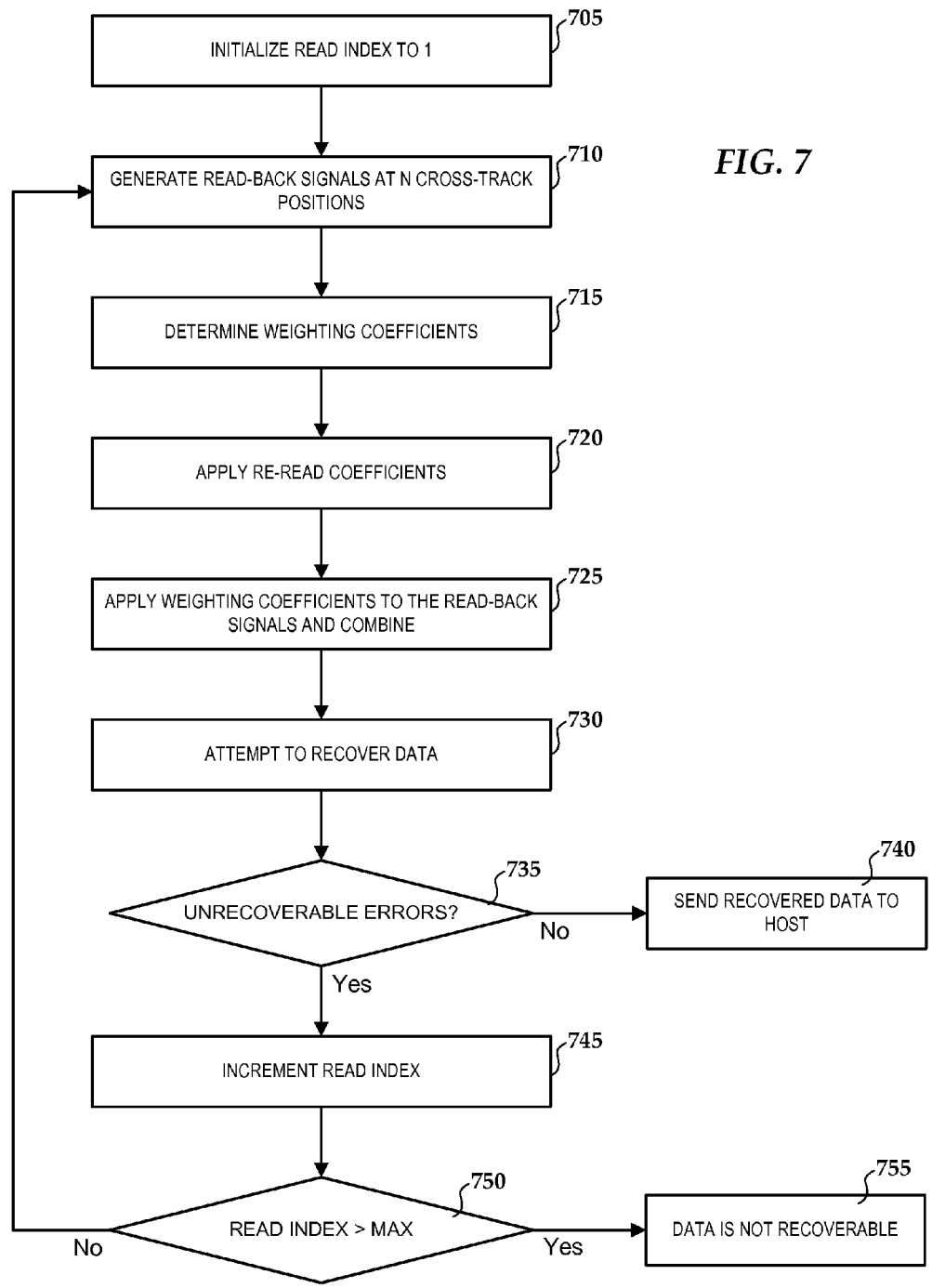
FIG. 7 is a flow diagram illustrating an approach that combines the techniques of multiple cross-track scans and combining re-read signals in accordance with some embodiments.

FIG. 7 is a flow diagram illustrating an approach that combines the techniques of multiple cross-track scans and the use of re-read signals in accordance with some implementations. Initially, a re-read index is set 705 to 1. A portion of a track is read from a magnetic medium. Read-back signals are generated 710 at each of N cross-track locations of the track. Weighting coefficients are determined 715 for each of the N read-back signals using a probabilistic technique such as MMSE or LMS. A re-read coefficient is applied 720 to the read-back signals for the current read. The read-back signals at a particular track location are combined, e.g., averaged. The weighting coefficients are applied 725 to each of the N combined (e.g., averaged) read-back signals. The N read-back signals modified by the weighting coefficients are combined. An attempt is made to recover 730 the data from the combined signal. If the data is recoverable 735 with no unrecoverable errors, the data may be sent 740 to a host or other processor. If the data includes one or more unrecoverable errors, the read index is incremented 745. If the number of re-reads has not exceeded 750 a maximum value, then the track portion is read again 710 at N different cross-track locations and the process continues to attempt to recover the data. If the number of re-reads exceeds the maximum value, then the data is not recoverable 755.

In some embodiments, the data recovery approach uses techniques for adjacent track interference cancellation (ATIC) in addition to multiple cross-track scans. Adjacent track interference cancellation can be performed for one or more of the N cross-track read-back signals, for example. In accordance with some embodiments, adjacent track interference cancellation can be applied to each of the N read-back signals for a track. Buffers BUFFER1, BUFFER2, ... BUFFERN would then hold 1-N read-back signals, wherein adjacent track interference cancellation has been applied to each of the 1-N read-back signals for the track.

Figure 8:
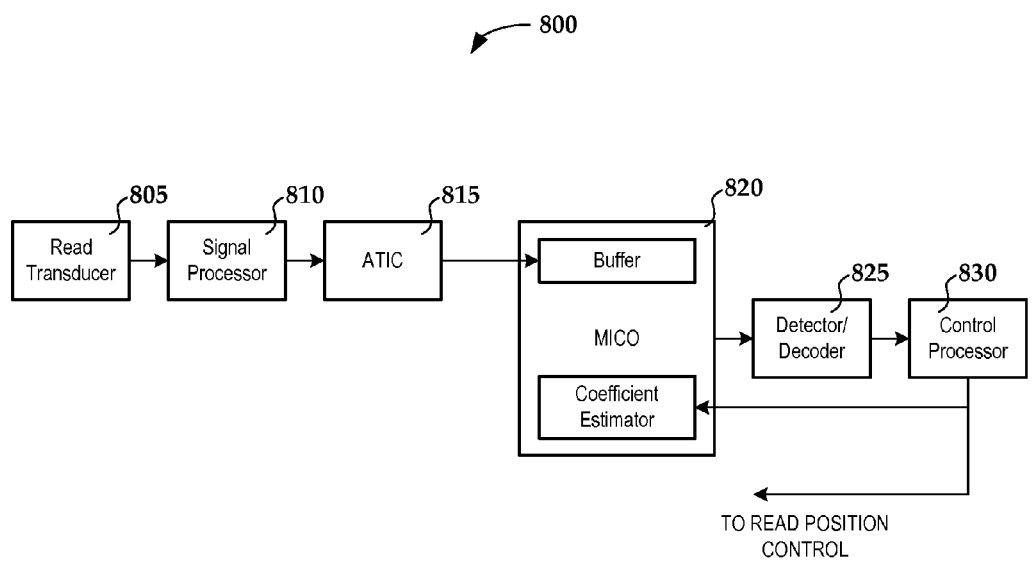
FIG. 8 is a block diagram of a noise cancellation system that includes adjacent track interference cancellation (ATIC) in addition to multiple cross-track scans for noise cancellation in accordance with some embodiments.

FIG. 8 is a block diagram of a noise cancellation system 800 that includes ATIC in addition to multiple cross-track scans for noise cancellation. A read transducer 805 generates read-back signals that are processed, e.g., amplified, filtered, digitized, by a signal processor 810. An ATIC unit 815 receives the read-back signals from the signal processor and is configured to perform adjacent track interference cancellation on the read-back signals. The read-back signals that have been processed by the ATIC unit 815 are stored in a buffer of the MICO unit 820. Weighting coefficients for each of the read-back signals in the buffer are estimated by the coefficient estimator of the MICO 820. The weighted read-back signals are combined in the MICO 820. A detector/decoder 825 converts the combined signal into ones and zeros and applies an ECC to identify and/or correct errors in the data. The control processor 830 feeds back an approximated data pattern as previously discussed to the coefficient estimator and also provides a feedback control signal to the read position control circuitry (not shown in FIG. 8).

Figure 9:
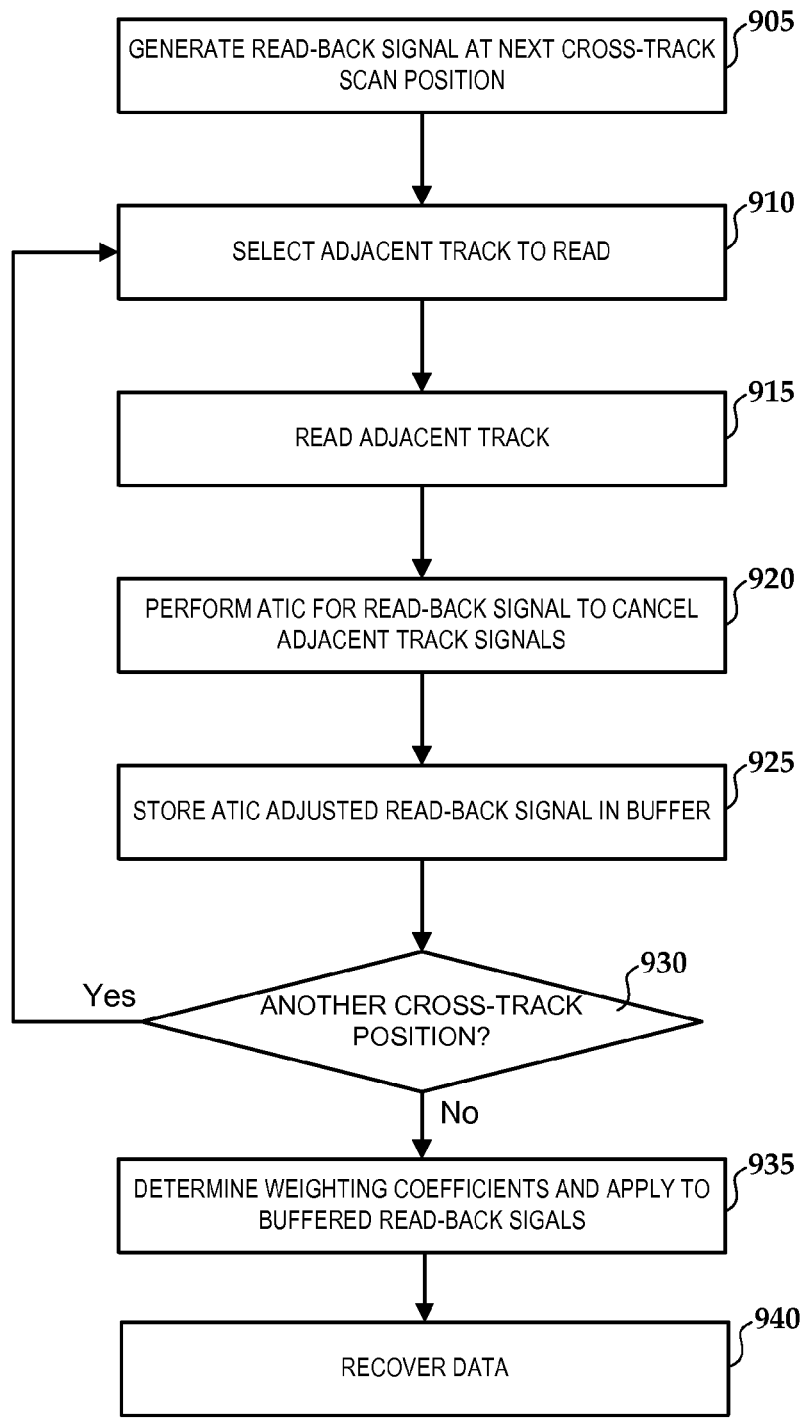
FIG. 9 is a flow diagram that illustrates a process of using multiple cross-track scans in conjunction with ATIC in accordance with some embodiments.

The flow diagram of FIG. 9 illustrates a process of using multiple cross-track scans in conjunction with ATIC. A first read-back signal is generated 905 at a cross-track position, e.g., see cross track positions $y_1, y_2, y_3, y_4, y_5, y_6, y_7, y_8$ shown in FIG. 1. Referring again to FIG. 1, the track 130 being read using the cross-track scans is disposed between adjacent track 131 and adjacent track 132. A track 131, 132 adjacent to the cross-track position of the track 130 being read is selected 910 for ATIC. For example, for cross-track scans at centered at track positions $y_1, y_2, y_3, y_4$, adjacent track 132 is closer to these positions and would be expected to produce greater interference. Thus, for cross-track scans of track 130 at cross-track positions $y_1, y_2, y_3, y_4$, adjacent track 132 is selected for ATIC. For cross-track scans of track 130 at cross-track positions $y_5, y_6, y_7, y_8$, adjacent track 131 is selected for ATIC.

The appropriate adjacent track is read 915 and ATIC is performed 920 for the read-back signal to cancel adjacent track interference. The adjacent track interference canceled read-back signal is stored 925 in the buffer, e.g., see BUFFER1, BUFFER2, . . . BUFFER N shown in FIG. 6. The process of 905-925 continues until 930 read-back signals at all of the cross-track positions have been read and adjacent track interference canceled. Weighting coefficients are determined 935 for the adjacent track interference cancelled read-back signals stored in the buffers. The weighted read-back signals are combined and the data is recovered 940 using the combined read-back signal.

In some embodiments ATIC involves recovering corrupted data values by sampling the original values stored on a first track and reading the binary values stored to a second track that is adjacent to the first track. The interfering value from the second track may then be input to a filter before being cancelled from an equalized sample of the first track. Initially, the system determines where the encroaching (e.g., overlapping) regions of the first and second tracks occur.

In accordance with one embodiment two determinations are used to determine where overlapping data occurs. A first determination of overlapping regions can be referred to as a "coarse" determination of overlapping regions. A second determination can be referred to as a "fine" alignment estimation.

The coarse determination takes into account that data is often not stored as complete sectors of data sequences. Rather, data fragments are often stored throughout sectors of a track. Such data fragments may be of different lengths and spread across different sectors of a track.

Similarly, adjacent tracks also store data as data fragments. Two adjacent tracks may overlap one another where fragments of data occur proximate one another but on different tracks. Adjacent fragments on the two tracks can occur at certain points where data fragments on the first track are adjacent and coextensive with data fragments on the second track. The coextensive regions on adjacent tracks could overlap causing adjacent track interference.

Some of the factors that make it difficult to correct interference caused by adjacent tracks are that (1) data fragments may not be perfectly aligned and located at regular intervals, (2) data fragments do not occur in regular lengths, and (3) data fragments do not necessarily begin at the beginning of a sector. In addition, irregularities in the storage of data in the downtrack direction in a particular track can make the cancellation of interference difficult. For example, different write operations can be made when the disc drive is operating at a different speed or under different power conditions. This can lead to frequency and phase errors in the writing of data to a track in the downtrack direction.

To account for some of these issues, a coarse determination is first performed in accordance with one embodiment. The coarse determination allows one to determine where adjacent track data occurs for two tracks. A data formatter stores the location of the beginning of each fragment of data stored on a track. Similarly, the formatter may also store the length of each data fragment. In accordance with one embodiment, this information may be utilized to make a coarse determination of overlapping regions for two tracks. Some approaches described herein determine where overlapping occurs so that the adjacent track cancellation procedures discussed herein can be implemented for data on adjacent tracks.

Figure 10:
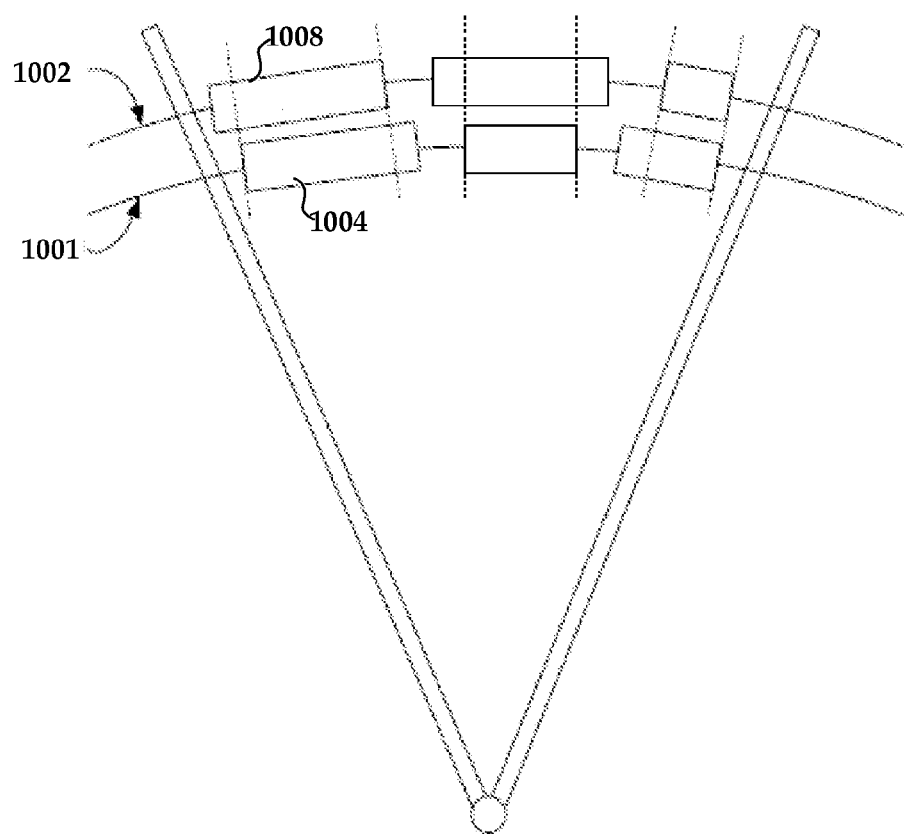
FIG. 10 shows a wedge of a magnetic medium that includes data fragments stored in adjacent tracks.

A data formatter may be programmed (1) to record where a data fragment begins in a track relative to a reference position and (2) to record the length of the data fragment. This effectively allows determination of a beginning position of the data fragment and an ending position of the data fragment. One way to accomplish this is to index the beginning position of a data fragment from the beginning position of a sector of a track, wherein each track is divided into multiple sectors. Referring to FIG. 10, for example, data fragment 1004 in track 1001 may begin 100 bits from the beginning of the sector. The data fragment may have a length of 2.5K. Similarly, data fragment 1008 in the adjacent track 1002 may begin 50 bits from the beginning of its sector and have a length of 2K. Thus, the overlapping regions occur roughly from Index+100 through Index+50+2K. The term "Index" is used to give the beginning position of the sectors as a reference point. FIG. 10 further represents in accordance with one embodiment that data for data correction can be retrieved from adjacent portions of two tracks that are not in a formatted alignment so that interference caused by one track encroaching on the other may be corrected.

Figure 11:
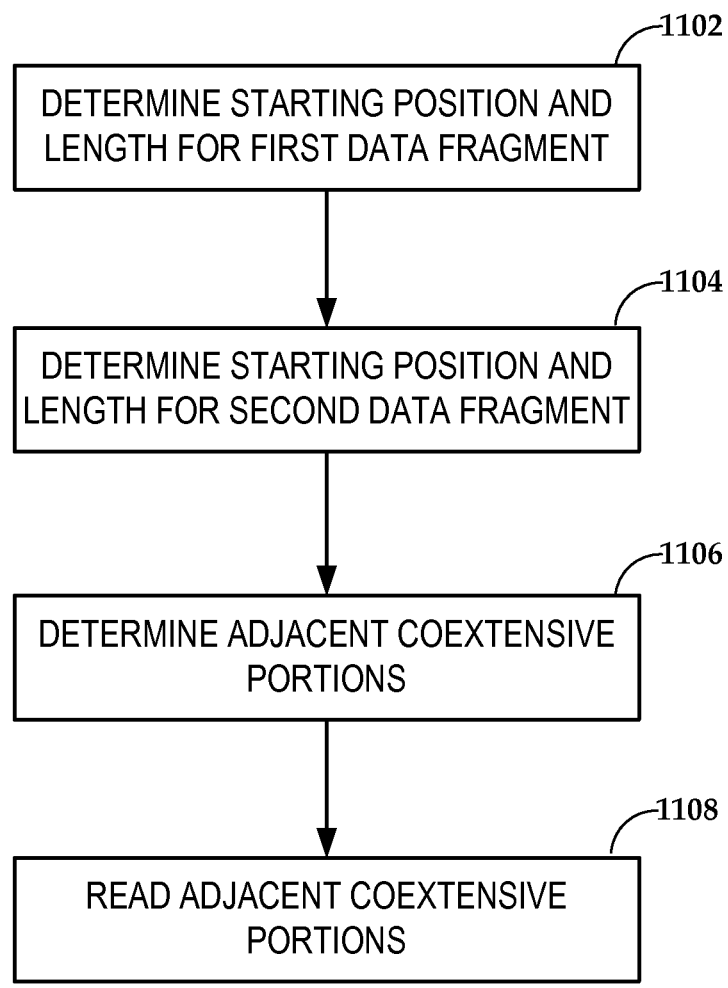
FIGS. 11 and 12 are flow diagrams that provide further examples of ATIC in accordance with some embodiments.
Figure 12:
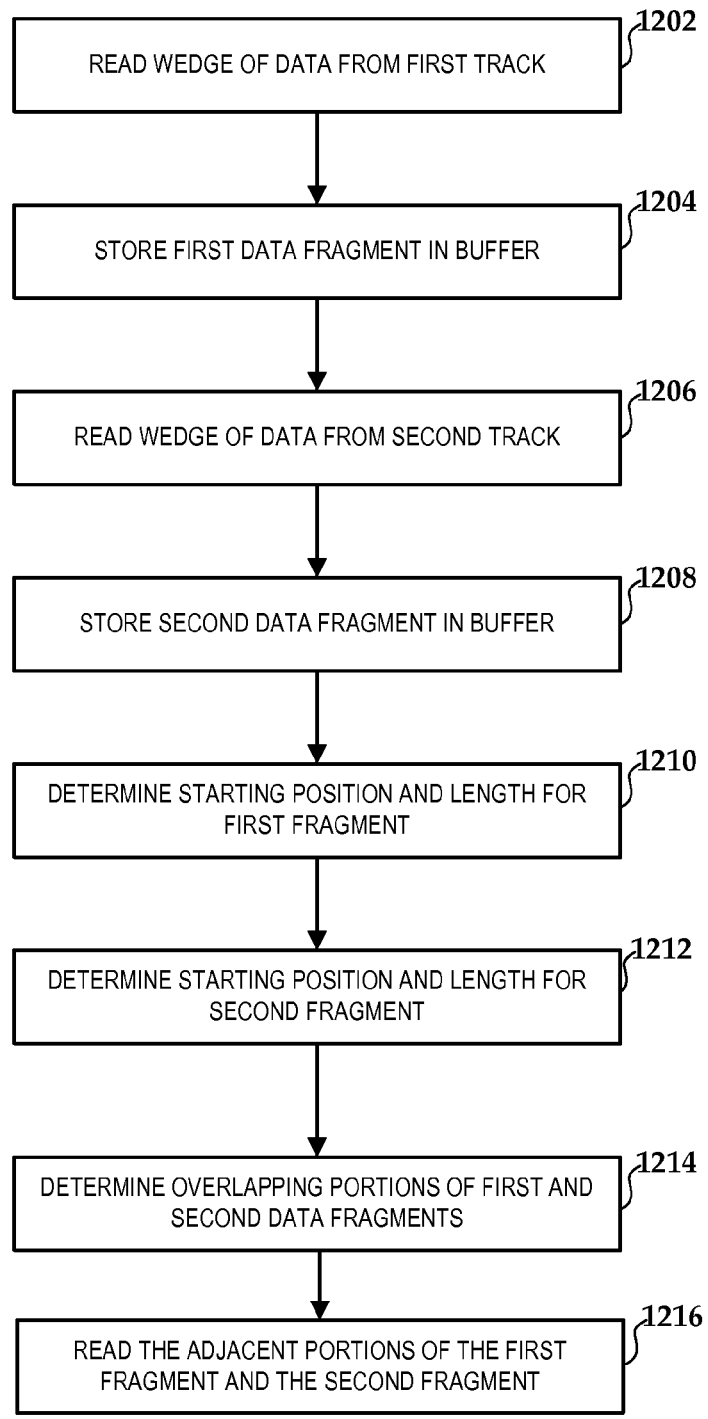

The flow diagrams in FIGS. 11 and 12 provide further examples ATIC. In operation block 1102 of the flow diagram of FIG. 11, a starting position and length for a first data fragment is determined. The first data fragment is located on a first track of a recording medium, which is the track being recovered using multiple cross-track scans. In block 1104, a starting position and length for a second data fragment may be determined. The second data fragment is located in a second track of the recording medium. In operation block 1106, adjacent coextensive portions of the first data fragment and the second data fragment may be determined. Once the adjacent coextensive portions of the first data fragment on the first track and the second data fragment on the second track have been identified, the adjacent coextensive values stored on each respective track can be read 1108 and utilized. The values are considered adjacent in that the values are near one another or overlap one another. The values are considered coextensive in that they have portions that are aligned in the circumferential direction.

Referring now to FIG. 12, another example of ATIC is illustrated. In operation block 1202, an entire wedge of data may be read for a first track. For example, multiple sectors of data can be read for the first track. The first track can also be referred to as the main track in this example and is the track that is being recovered using multiple cross-track scans. The data on first track is considered to be potentially corrupted due to interference from the adjacent track, thus, a non-return-to-zero (NRZ) value for each data bit on the main track may not be discerned. Thus, sampling the data on the main track and storing an equalized signal value for each bit position may be performed. The data values for this wedge of data may be stored in a first computer memory buffer. As shown in operation block 1204, part of the wedge of data may include a first data fragment.

In operation block 1206, the data from an adjacent track may be read. It is assumed for purposes of this example that the data for this neighboring track was written to the neighboring track after the data for the main track was written to the main track. Thus, the data for the neighboring track may overlap part of the main track and corrupt the main track's values. The data values for the wedge of data on the neighboring track may be stored in a second memory buffer. As noted in block 1208, part of this wedge of data may include a second data fragment.

Operation block 1210 shows that a device such as a microprocessor or data formatter may determine a starting position for the first data fragment. Again, the first data fragment is understood to be stored on the first data track. Operation block 1212 similarly shows that a starting position and length for the second data fragment may be determined by the microprocessor or data formatter. The second data fragment is stored on the second track of the magnetic recording medium. Based on these coarse positions noted for the first and second data fragments, the overlapping portions of the first and second data fragments are shown, as shown by block 1214.

Once the boundaries of the overlapping data fragments are known, subsequent operations may be performed to fine tune the overlap determination and to cancel any interference. Thus, block 1216 shows that the adjacent portions of the first data fragment and the second data fragment may be read, e.g., read from the buffers or read again from their respective tracks.

As noted above, the initial overlap determination is considered a "coarse" overlap determination. This is because that initial determination does not necessarily create a precise determination of where the overlap begins and end. Rather, it typically provides an estimation of the beginning of the overlap within about +/− two symbols or 24 data bits. This discrepancy can be caused by the phase/frequency error that is due to varying physical write operations. As discs spin at different speeds, an actual write operation can take place away from the ideal targeted location. Typically, this error is about +/− two symbols or 24 data bits. Thus, one needs to fine tune the initial coarse alignment in order to determine the actual alignment of overlap between two data fragments on different tracks.

Figure 13:
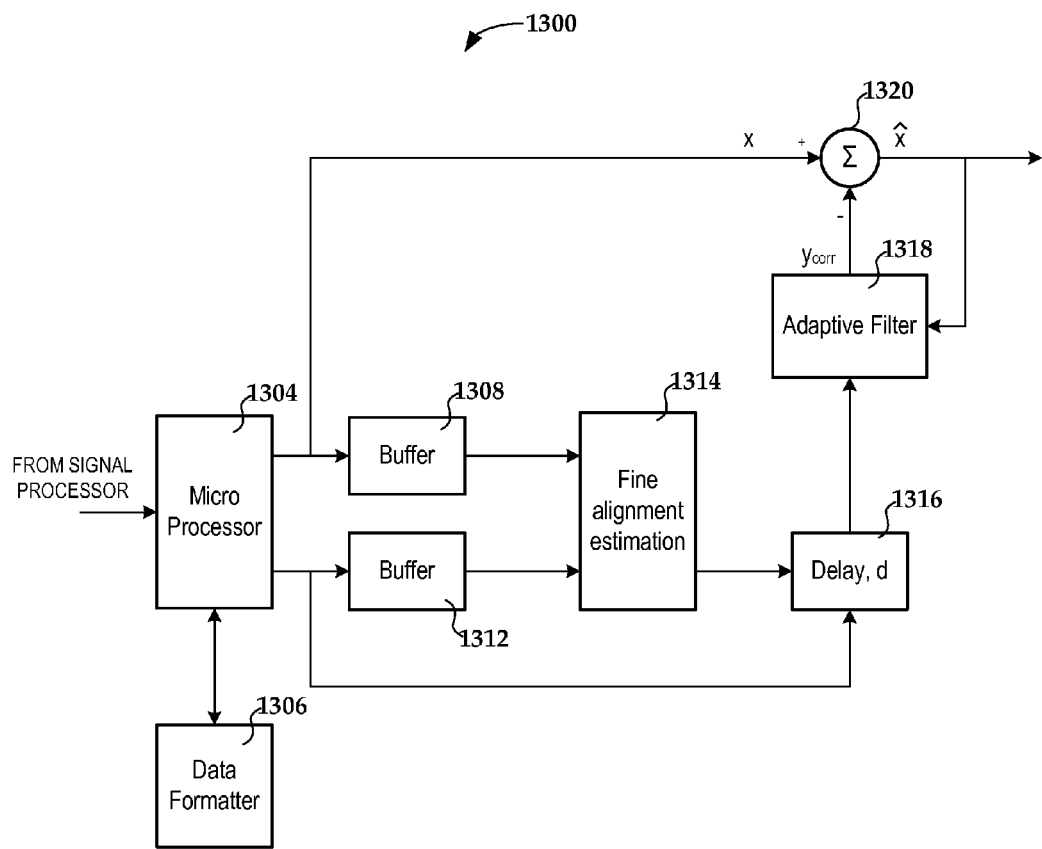
FIG. 13 is a block diagram of an circuit that can be used for the ATIC fine tuning process in accordance with some embodiments.

FIG. 13 is a block diagram of an ATIC circuit 1300 that can be utilized for the fine tuning process. A microprocessor 1304 may be used to coordinate the retrieval and storage of data as well as to perform the mathematical operations used to perform ATIC functions. A data formatter 1306 can be used to record the positions of data fragments for each track that are stored on the magnetic disc medium as well as the length of each data fragment. Alternatively, the microprocessor 1304 can perform the function of the data formatter.

The microprocessor 1304 can coordinate the storage of data that is read from the magnetic disc medium. For example, FIG. 13 shows that the microprocessor 1304 can store data that is read from a particular cross-track location of a first track of the magnetic medium in computer memory buffer 1308. For purposes of this example, that data is referred to as main track data which is the data being recovered using multiple cross track scans. Similarly, data read from an adjacent track of the magnetic medium may be stored in computer memory buffer 1312.

As explained above, a coarse determination can be performed to identify portions of the main and adjacent track that are believed to overlap. That coarse determination can be performed by the microprocessor 1304. Alternatively, the coarse determination might be performed by the data formatter if the data formatter has processing capabilities. Data from the main and adjacent tracks can be read from the magnetic medium and stored in buffers 1308 and 1312, respectively. Using the values from the coarse overlap determination, the data values from the main and adjacent track can be successively output from the buffers 1308 and 1312 as streams of data in coarse alignment. A fine alignment estimator 1314 determines a delay value that fine tunes the actual overlap boundaries so that appropriate interfering signal can be selected from the overlapping track in order to perform a correction. Fine alignment estimation can be performed by microprocessor 1304 but is shown as a separate function block for purposes of illustration. The output of the fine alignment estimator 1314 is a delay value, d.

The fine alignment estimation performed by block 1314 is based on cross-correlating the equalized samples read from the main track and the NRZ bits read from the adjacent track. The cross-correlation peak location with respect to the center gives the delay value, d. The initial fine alignment can be performed over a short window after the adjustment for coarse alignment is made. The cross-correlation function samples near the peak also provide a good estimate of an initial cancellation filter.

The delay value, d 1316 is used to adjust the stream of values output by the buffer 1312. For example, if the value of the delay 1316 indicates that the stream from buffer 1312 should be delayed by 10 data bits due to correct for phase/frequency variation and thus to achieve a correct correspondence for overlapping data, then the bit stream output from block 1316 can be delayed by 10 bits.

An adaptive filter 1318 may be used to address aberrations caused by phase and frequency inconsistencies in how data was written to a particular track in the downtrack direction. For example, data values written to a track that are targeted for a particular location can vary from that targeted location due to phase and frequency errors during the write process. During the process of writing a sequence of data to a track, there can be variation in spacing of data bits along the track as well. The adaptive filter also can change the amplitude of a signal read from a track in order to account for crosstrack variations. In order to perform the interference cancellation, first, a fine alignment is performed between the equalized signal from the first track and the NRZ bits from the second track. The aligned NRZ bits are then applied to the filter, whose output represents an estimation of the interference, which may be subtracted (canceled) from the equalized signal to give an interference-free signal.

Once the adaptive filter 1318 has determined a correction value, $y_{corr}$, the correction value $y_{corr}$ can be utilized to cancel the interference of the adjacent track from the main track. The summation symbol 1320 in FIG. 13 represents that the output of the adaptive filter 1318 may be used to cancel the interference in equalized sample value, x, of the main track. This produces $\hat{x}$ as the output. The $\hat{x}$ value may be fed back to the adaptive filter 1318 as a feedback value. Moreover, $\hat{x}$ may also be re-written over the corrupted data location on the magnetic medium so that subsequent reads may be read correctly. Furthermore, $\hat{x}$ may be passed to the function that is trying to retrieve the value from the magnetic medium. In accordance with one embodiment for the adaptive filter, the taps for the filter can be selected updated or adjusted according to the following relationship:

$$f_{k+1} = f_k + \mu(-\partial J(f)/\partial f)|_{f=f_k} \quad [25].$$

The above equation can be restated as:

$$f_{k+1} = f_k + \mu e_k a_k \quad [26].$$

In Equation 26, $\mu$ is a parameter called adaptation step size, which is selected to speed up or slow down the tracking depending on the rate of variation of the frequency offset. The function J(f) represents the MMSE criterion of the filter. The parameter $e_k$ represents the error between the equalized signal of the first track and the interference canceller's output. The vector $a_k$ represents the data values being input to the filter. The aforementioned taps $f_k$ being initialized using the cross-correlation used in the fine alignment, are adjusted for each data sample at time k, using the above expression.

Figure 14:
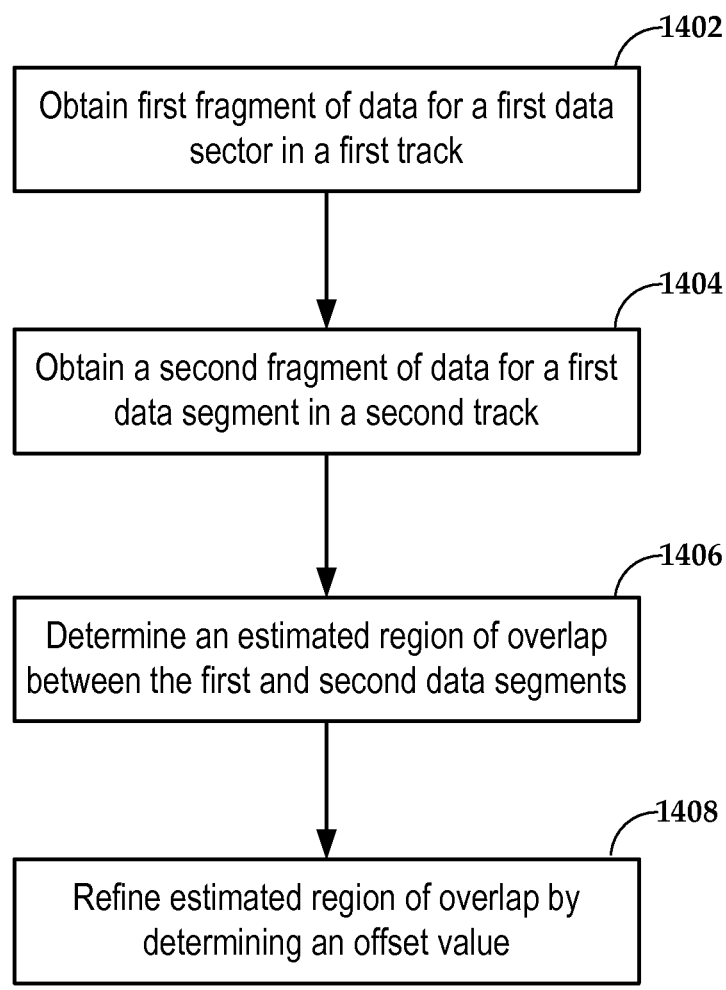
FIGS. 14 and 15 are flow diagrams illustrating ATIC processes in accordance with some embodiments.

FIG. 14 is a flow diagram illustrating an ATIC process in accordance with some embodiments. In operation block 1402, a first data fragment can be obtained. The first data fragment is for a first data sector in a first track of a magnetic storage medium. In block 1404, a second data fragment can be obtained. An estimated region of overlap can be determined, as shown in block 1406. This estimated region of overlap may then be refined by determining an offset value, e.g. a "fine tune" offset value. The offset value may be used to adjust 1408 the estimated beginning portion of overlap by the second fragment, for example.

Figure 15:
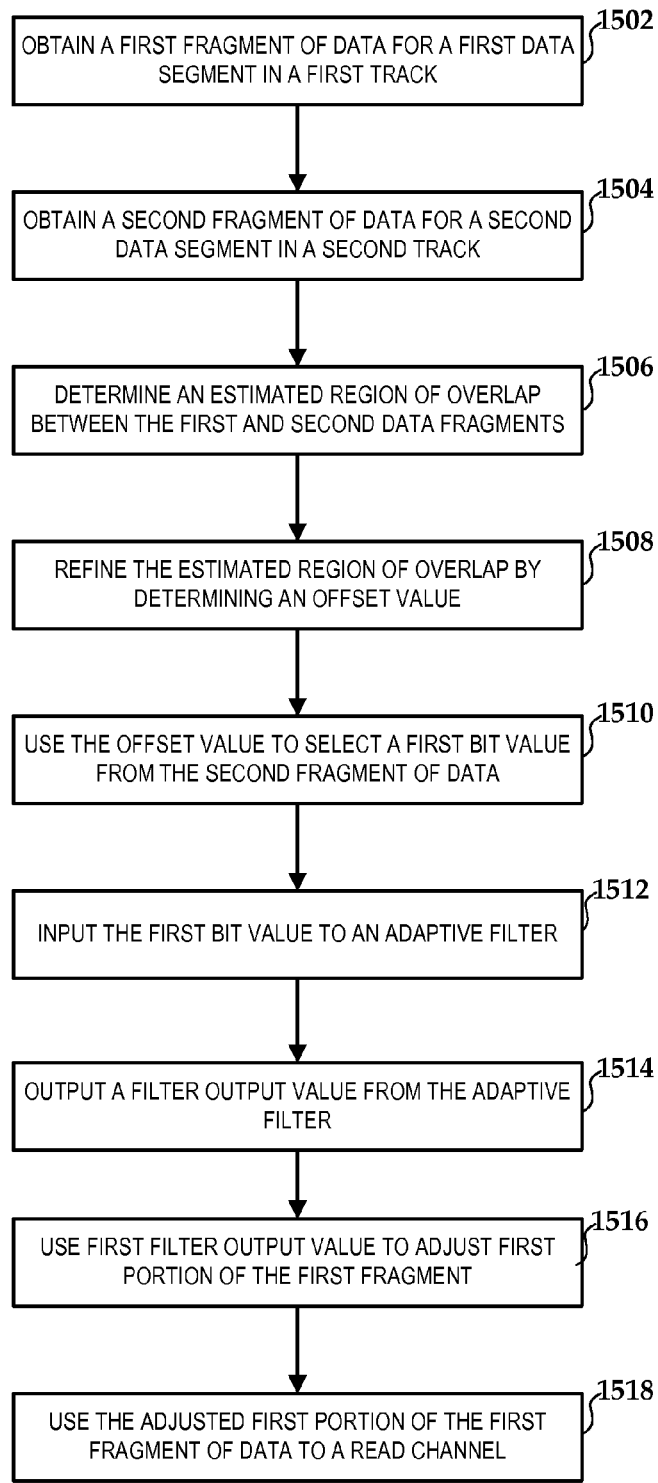

FIG. 15 illustrates a more detailed example of an ATIC process. In operation block 1502, a first fragment of data for a first data sector in a first track of a magnetic medium is obtained. Similarly, block 1504 shows that a second fragment of data for a second data sector in a second track of the magnetic storage medium is obtained. The second track is an adjacent track in this example.

In block 1506, a determination can be made of the estimated region of overlap between a first data fragment and a second data fragment. The estimated region of overlap can be refined, as shown by operation block 1508. This can be done by determining an offset value. The offset value can offset the estimated beginning position of overlap by the second fragment. This offset value may be used, as shown in block 1510, to select a first bit value from the second fragment of data that overlaps the first portion of the first fragment of data. This value can be input into an adaptive filter as shown in block 1512. The adaptive filter can output a filter output value 1514. For example, the output value may be adjusted in amplitude.

In block 1516, the adaptive filter output value may be used to adjust the corresponding data value on the corrupted first track. Since the first track is read as sampled data rather than actual NRZ data, this corresponding data is referred to as the first portion of the first fragment of data in the first track for purposes of this example. In block 1518, the adjusted first portion of the first fragment can be output to the buffer of the MICO.

The adaptive filter will typically achieve better results as it uses more data and receives more feedback. Thus, in accordance with one embodiment, a forward and backward pass can be made through the region of overlapping data, for example. Thus, a first forward pass can be made by proceeding from the beginning of the overlapping region for each bit of the overlapping region. Then, a backward pass can be made from the end of the overlapping region towards the beginning of the overlapping region. Values initially determined at the beginning of the forward pass when little feedback was available can be corrected further based on the backward pass. The recovered data may then be stored or used at that point. Alternatively, one could process data from the end of the overlapping regions first and then reverse the process. This alternative approach would effectively be a backward pass followed by a forward pass.

Figure 16A:
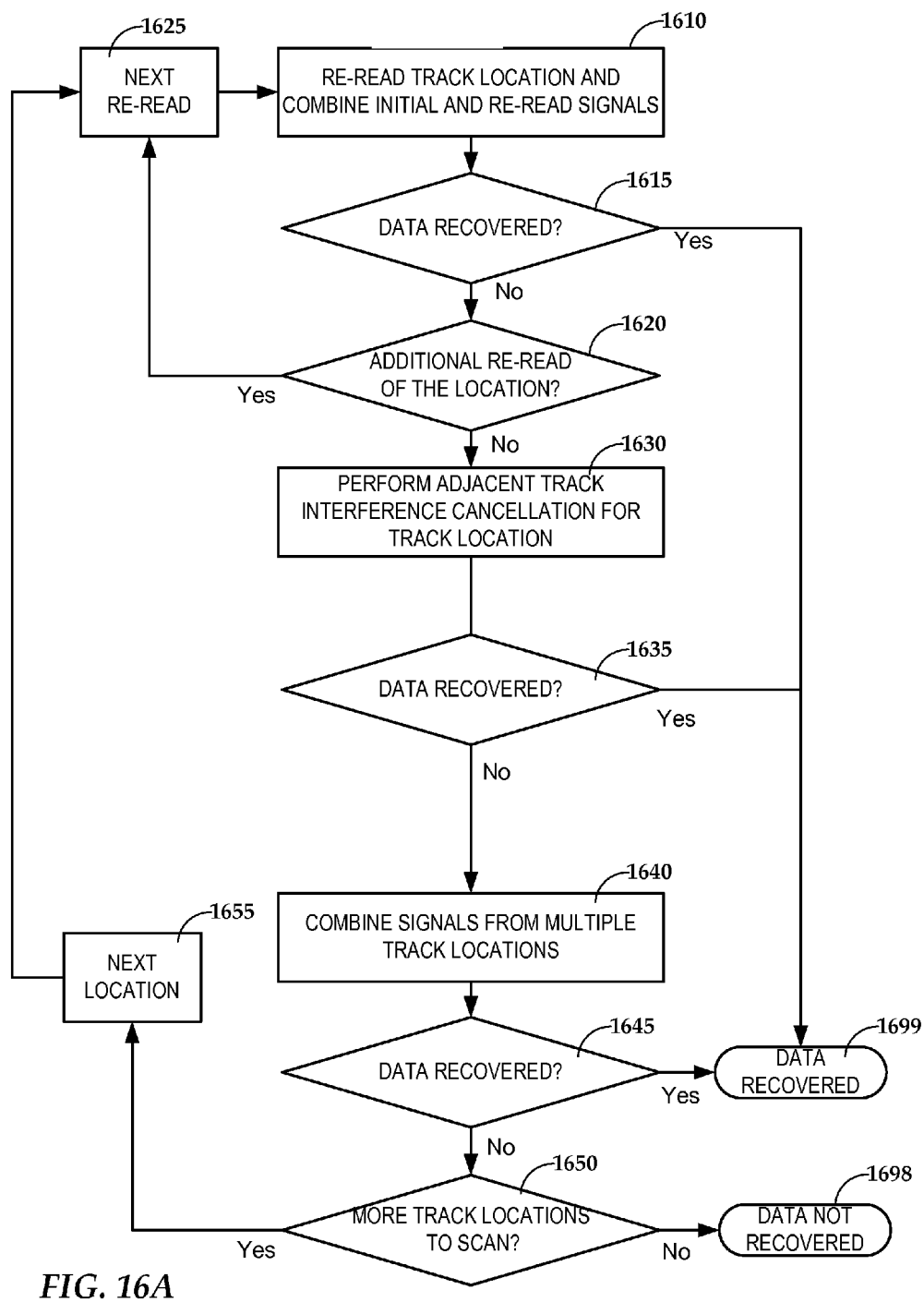
FIG. 16A illustrates a process that attempts to recover data using multiple data recovery techniques.

As described in this disclosure, a number of data recovery techniques may be attempted to recover the data. In implementations that use a number of techniques, the system can determine the number and the order that the techniques are applied. The number and the order of techniques used may be based on a history of success for one or more particular techniques or particular order. The system may apply each technique successively until data recovery is achieved. If one of the data recovery techniques is successful, the other techniques may not be implemented to recover the data, FIG. 16A is a flow diagram that illustrates the use of several data recovery techniques. Although the flow diagram of FIG. 16A shows a particular order that the techniques are used to attempt data recovery, any order for implemented the techniques maybe used.

The process of FIG. 16A attempts to recover data by re-reading 1610 a track location multiple times and combining the read-back signals for the location. If the data is recovered 1615 using the re-read technique, then the process ends successfully 1699. If additional re-reads are to be attempted, then the next re-read signal is obtained 1625 and combined 1610. If no additional re-reads are to be attempted 1620, the process tries to recover the data by performing 1630 adjacent track interference cancellation. If the data is recovered 1635 using the ATIC technique, then the process ends successfully 1699. If ATIC is unable to recover 1635 the data, then read-back signals from additional cross-track scans may be performed 1640 to recover the data. An additional scan at a new cross-track location is performed and the read-back signals are combined as discussed herein. If combination of multiple cross track scans recovers 1645 the data, then the process ends successfully 1699. However if the data is not recovered, and there are more cross-track locations to scan 1650, the process may return to attempt the re-read technique on another track location 1655. If there are no more track locations to scan and the data has not been recovered, the process ends unsuccessfully 1698.

Figure 16B:
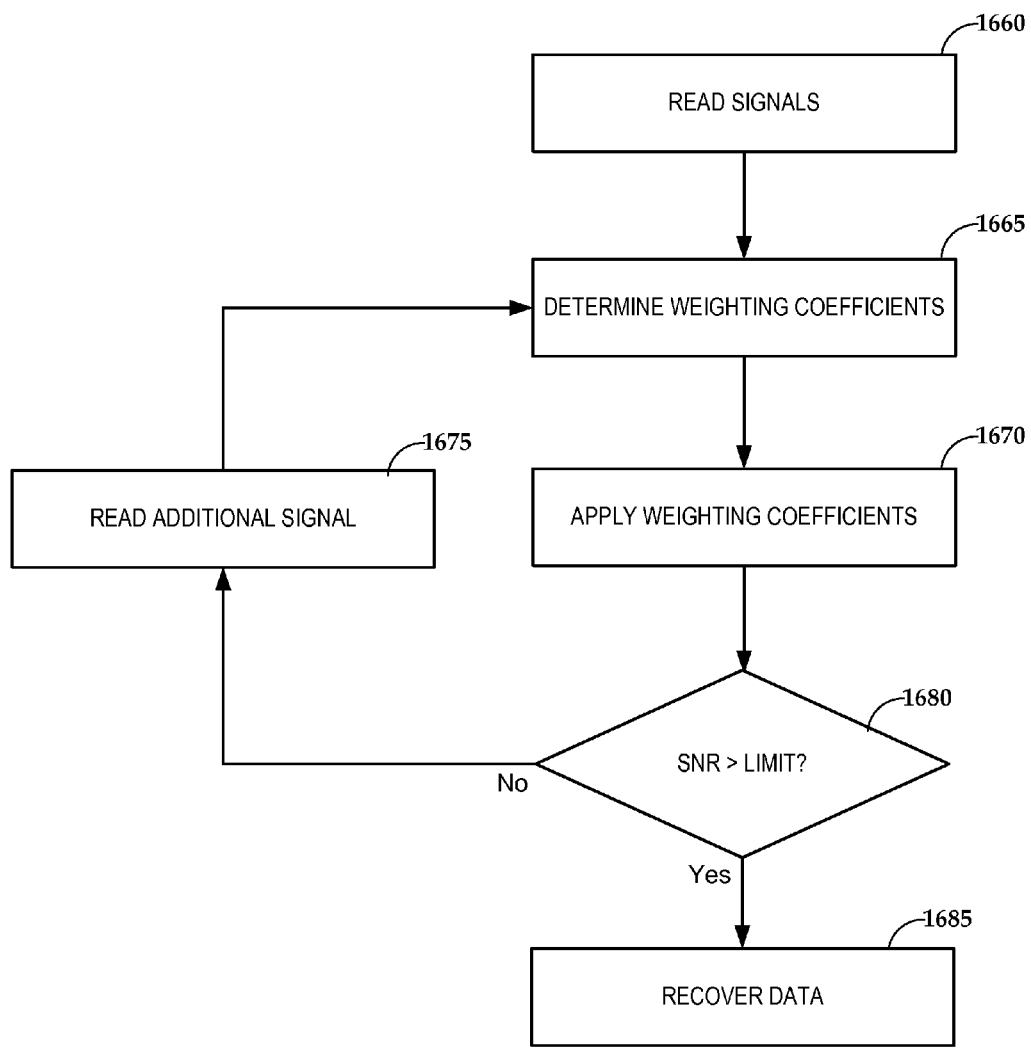
FIG. 16B illustrates a process wherein the MICO unit determines an optimal number of signals to read (of to combine) to produce the combined signal in accordance with some embodiments.

Referring again to FIG. 4, the MICO 420 may be capable of determining the optimal number of signals to combine to produce the combined signal, as illustrated by the flow diagram of FIG. 16B. Determining the optimal number of signals can allow for more efficient implementation to achieve a specified SNR without incurring unnecessary reads.

The system reads 1660 two or more signals from different cross-track positions of a track. Weighting coefficients for the two or more signals are determined 1665 and the weighting coefficients are applied 1670 to the two or more signals to form weighted signals. The weighed signals are combined to form a combined signal and the SNR of the combined signal is determined. If the SNR of the combined signal is greater than 1680 a limit, the data is recovered 1685 from the combined signal. If the SNR of the combined signal is less than 1680 the SNR limit, then one or more additional signals are read 1675 from one or more additional cross-track positions of the track. The weighting coefficients are determined 1665 for the two or more initial signals and the one or more additional signals. The combined signal is determined using the weighting coefficients and the SNR of the combined signal is re-checked. Additional reads are performed at additional cross-track positions until the SNR is greater than the limit. After a sufficient number of reads cause the SNR to increase beyond the limit, the data is recovered 1685. In some implementations, the SNR limit may be a predetermined SNR values. In other implementations, the SNR limit may be based on one or more or the individual signals. For example, the SNR limit may be expressed as a delta or percentage improvement over the SNR of the highest SNR signal.

Reading data from multiple cross-track positions of a single track may be implemented using a read element having a single read transducer 120 that makes multiple passes at the different cross track positions. For example, with reference to FIG. 1, in a first pass at time $t_1$, the read transducer 120 may read the track 110 at cross-track position $y_1$ as the medium 110 moves relative to the transducer 120 along the direction 130. The read transducer 120 is moved to cross-track position $y_2$, and the read transducer 120 reads the track 110 at the cross-track position $y_2$ as the medium moves relative to the transducer 120. The read transducer 120 is moved to cross-track position $y_3$, and the read transducer reads the track 110 at the cross-track position y₃ as the medium moves relative to the transducer 130 along the down track direction 130. This process continues until the track has been read a number of times. In the example of FIG. 1, the transducer 120 reads the track total of seven times at times $t_1$, $t_2$, $t_3$, $t_4$, $t_5$, $t_6$, $t_7$ at down-track positions $y_1$, $y_2$, $y_3$, $y_4$, $y_5$, $y_6$, $y_7$ producing seven read signals, i.e., one read signal per down-track position. The read transducer 120 is shown with a solid lines at position y1 and the position of the read transducer is shown as dashed lines at positions $y_2$, $y_3$, $y_4$, $y_5$, $y_6$, $y_7$. Note that the terms "first," "second," "third," etc. are used to distinguish the different passes of the read transducer relative to the track along the down-track direction and are not meant to imply any particular order of the passes of read transducer relative to the track along the down-track direction.

Figure 17:
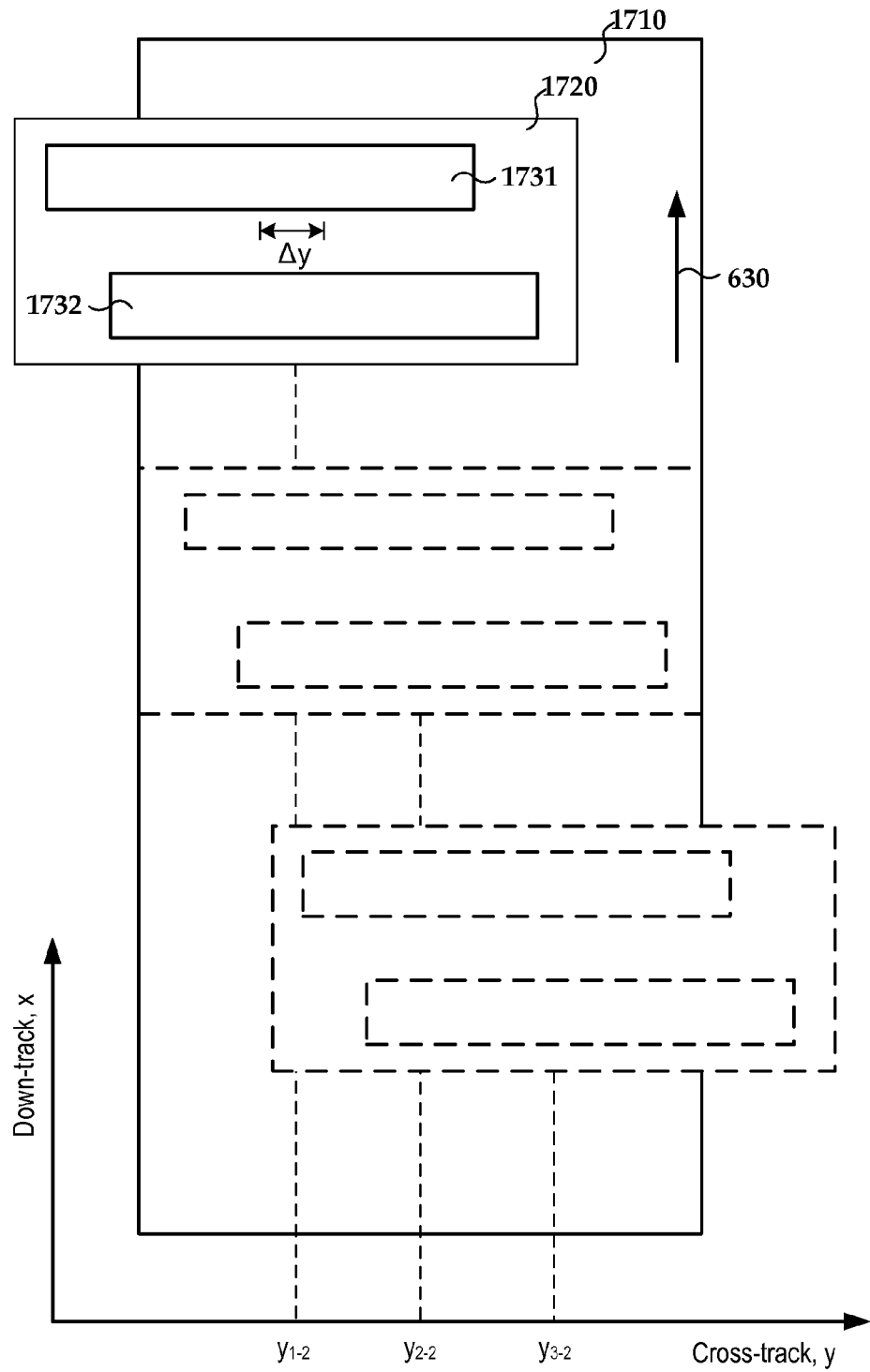
FIG. 17 depicts a read element that includes multiple read transducers and is capable of performing multiple cross-track scans in accordance with some embodiments.

Alternatively, as shown in FIG. 17, a read element 1720 may include multiple read transducers 1721, 1722 that are offset from each other by an offset value, $\Delta y$, along the cross-track direction. One pass of the multiple transducer read element 1720 over the track 1710 along the down-track direction (indicated by arrow 1730) can produce multiple readback signals. During a first pass, the multiple transducer read element 1720 is positioned (e.g., centered) at a first cross-track position, y8 and the two transducers 1721, 1722 read two signals from the track at two cross-track locations, $y_8-\Delta y/2$ and $y_8+\Delta y/2$, respectively. During a second pass the multiple transducer read element 1720 is positioned at a second cross-track position, $y_9$ and the two transducers 1721, 1722 read two signals at cross-track locations $y_9-\Delta y/2$ and $y_9+\Delta y/2$, respectively. During a third pass the multiple transducer read element 1720 is positioned at a third cross-track position, $y_9$ and the two read transducers 1721, 1722 read two signals at cross-track locations $y_{10}-\Delta y/2$ and $y_{10}+\Delta y/2$, respectively. In FIG. 17, the multiple transducer read element 1720 is shown with solid lines at position $y_8$ and the position of the read element 1720 is shown with dashed lines at positions $y_9$ and $y_{10}$. Note that the terms "first," "second," and "third" are used to distinguish the different passes of the read element relative to the track along the down-track direction and are not meant to imply any particular order of the passes of read element relative to the track along the down-track direction.

Figure 18:
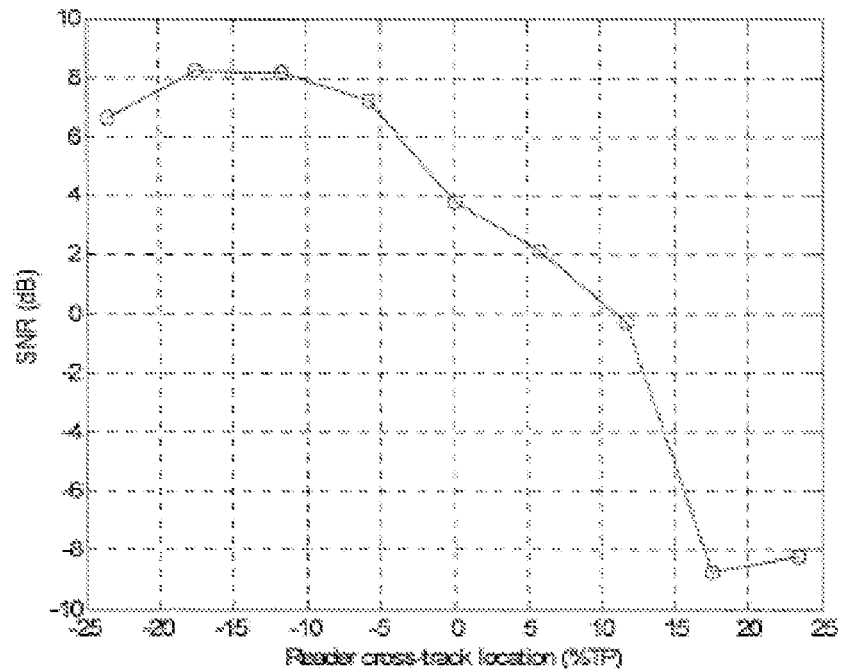
FIG. 18 is a graph that shows the signal to noise S/N ratio for multiple signals read from a track at different cross-track positions where the track is subjected to severe adjacent track squeeze.

FIG. 18 is a graph that shows the SNR for multiple signals read from a track at different cross-track positions where the track is subjected to severe adjacent track squeeze. The term "severe", means a squeeze stress event that is so strong that a single read-back signal is not sufficient to allow the data to be recovered. The horizontal axis of FIG. 18 shows the position of the reader as a percentage of track pitch (% TP) and the y axis corresponds to values of the signal SNR as a function of cross-track position. In this example, a sector of the track was read over a range of reader offsets, (−24%, −18%, . . . , +18%, +24%). The highest SNR for the individual signals was 8.19 dB which occurred at −18% of the track pitch.

Figure 19:
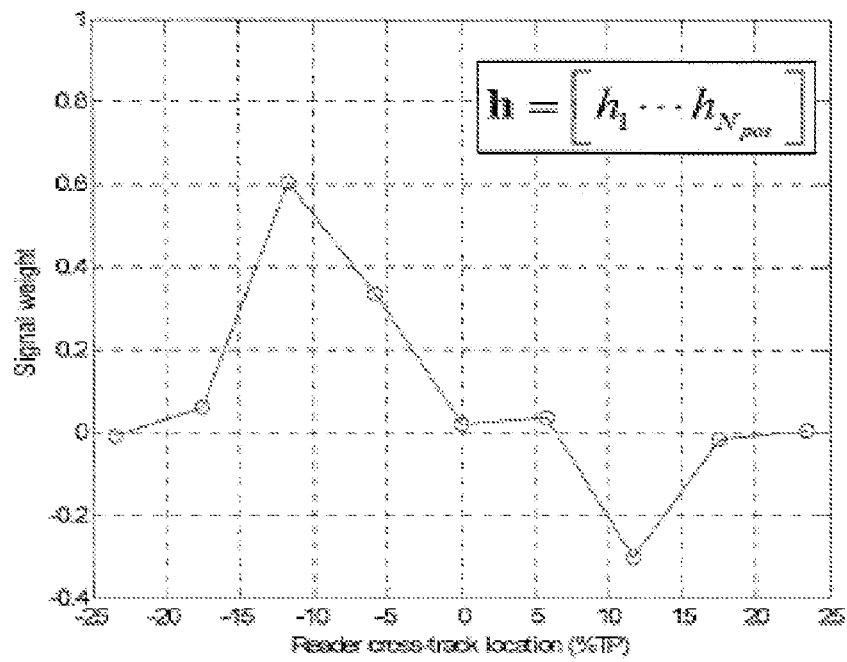
FIG. 19 is a graph showing the weights of the signals obtained from solving for $h=R^{-1}p$ as a function of percent of track pitch in accordance with embodiments described herein.

Weighting coefficients for the individual signals were determined using the MMSE estimation technique. The weighting coefficients were determined by estimating R and P from the individual cross-track read-back signals and then solving $h=R^{-1}p$. FIG. 19 shows the weights of the signals obtained from solving for $h=R^{-1}p$ as a function of percent of track pitch. The weighting coefficients were applied to the signals and the weighted signals were combined. The combined signal had an SNR of 8.72 dB, providing an SNR enhancement of +0.53 dB over the highest SNR of the individual signals.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate managing information detection in data storage devices as described above.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method comprising:
   reading multiple signals from multiple different cross-track positions relative to a track of a medium;
   determining weighting coefficients for the multiple signals;
   applying the weighting coefficients to the multiple signals to form weighted signals;
   combining the weighted signals to form a combined signal; and
   recovering data stored in the track using the combined signal,
   wherein the combined signal has a signal to noise ratio that is higher than a signal to noise ratio of any of the multiple signals.

2. The method of claim 1, wherein determining the weighting coefficients comprises determining the weighting coefficients using a model based on statistical information.

3. The method of claim 1, wherein determining the weighting coefficients comprises determining a weighting coefficient for each of the multiple signals using minimum mean square error estimation (MMSE).

4. The method of claim 3, wherein determining the weighting coefficient for each of the multiple signals using MMSE comprises determining a weighting coefficient vector $h=R^{-1}p$ using an autocorrelation matrix R and a cross-correlation vector p determined from the multiple signals.

5. The method of claim 3, wherein determining the weighting coefficient for each of the multiple signals comprises using a least means square (LMS) algorithm based on an error signal between an ideal signal and a combined signal.

6. The method of claim 1, wherein determining the weighting coefficients for the multiple signals comprises determining a weighting coefficient for each of the multiple signals using a maximum likelihood method.

7. The method of claim 1, further comprising determining a number of the multiple signals used to recover the data.

8. The method of claim 1, wherein reading the multiple signals comprises reading additional ones of the multiple signals at different cross-track locations until a predetermined signal to noise ratio is achieved.

9. The method of claim 1, wherein reading the multiple signals comprises reading additional ones of the multiple signals at different cross-track locations until a signal to noise ratio of the combined signal is at least a predetermined percentage greater than any one of the multiple signals.

10. The method of claim 1, wherein:
reading the multiple signals at the multiple different cross-track positions comprises reading a first signal at a particular cross-track position; and
further comprising:
re-reading a second signal at the particular cross-track position;
combining the first signal and the second signal; and
determining the weighting coefficients using the combined first and second signals.

11. The method of claim 1, further comprising cancelling adjacent track data from at least one of the multiple signals.

12. An apparatus comprising:
a controller capable of being coupled to a read transducer and configured to cause a read transducer to read multiple signals from multiple cross-track positions relative to a track of a magnetic medium;
a multiple input/common output (MICO) unit configured to
determine a weighting coefficient for each signal;
apply the weighting coefficients to the respective signals to determine weighted signals;
form a combined signal which is a combination of the weighted signals, the combined signal having a signal to noise ratio that is higher than a signal to noise ratio of any of the signals; and
recover data using the combined signal.

13. The apparatus of claim 12, wherein the controller is configured to determine a weighting coefficient for each signal using a minimum mean square error estimation.

14. The apparatus of claim 12, wherein the controller is configured to determine a weighting coefficient for each signal using an estimation based on a statistical model.

15. The apparatus of claim 12, wherein the controller is configured to determine a number of the multiple signals used to recover the data stored in the track.

16. The apparatus of claim 12, wherein:
the controller is configured to:
cause the read transducer to read a first signal and a re-read a second signal at each of the multiple cross-track positions; and
combine the first and second signals to form combined signals; and
the MICO unit is configured to:
determine weighting coefficients for the combined signals;
apply the weighting coefficient to the combined signals to form weighted combined signals;
combine the weighted combined signals into a combined and weighted combined signal; and
recover the data using the combined and weighted combined signal.

17. The apparatus of claim 12, further comprising an adjacent track interference cancellation (ATIC) unit configured to read data from a track adjacent to a track being read using multiple cross-track scans and to cancel the data read from the adjacent track from one or more of the multiple signals.

18. The apparatus of claim 17, wherein the ATIC unit comprises an adaptive filter.

19. A system comprising:
a transducer to read a first signal at a particular cross-track position relative to a target track and read a second signal at the particular cross-track position;
a controller to determine weighting coefficients for the first and second signals, apply the weighting coefficients to the first and second signals to form weighted signals, combine the weighted signals to form a combined signal, and recover data in the target track using the combined signal, wherein the combined signal has a signal to noise ratio that is higher than a signal to noise ratio of each of the first and second signals.

* * * * *